(12) United States Patent
Tian et al.

(10) Patent No.: US 12,012,348 B2
(45) Date of Patent: Jun. 18, 2024

(54) INTEGRATED DEVICE AND TREATMENT METHOD FOR SYNCHRONOUS ECOLOGICAL TREATMENT OF DOMESTIC SEWAGE AND SLUDGE

(71) Applicant: Harbin Institute of Technology, Harbin (CN)

(72) Inventors: Yu Tian, Harbin (CN); Junjie Chen, Harbin (CN); Lipin Li, Harbin (CN); Wei Zhan, Harbin (CN)

( * ) Notice: Subject to any disclaimer, the term of this patent is extended or adjusted under 35 U.S.C. 154(b) by 0 days.

(21) Appl. No.: 18/299,366

(22) Filed: Apr. 12, 2023

(65) Prior Publication Data

US 2023/0322601 A1 Oct. 12, 2023

(30) Foreign Application Priority Data

Apr. 12, 2022 (CN) .......................... 202210380178.8

(51) Int. Cl.
*C02F 9/00* (2023.01)
*C02F 1/00* (2023.01)
(Continued)

(52) U.S. Cl.
CPC .......... *C02F 9/00* (2013.01); *C02F 2001/007* (2013.01); *C02F 1/325* (2013.01);
(Continued)

(58) Field of Classification Search
None
See application file for complete search history.

(56) References Cited

U.S. PATENT DOCUMENTS

| 4,231,322 A * | 11/1980 | Gilpatric ................ A01K 61/54 |
| | | 119/237 |
| 2020/0238257 A1* | 7/2020 | Yoo .......................... B01J 23/34 |
| 2022/0031967 A1* | 2/2022 | Park ..................... A61M 11/005 |

FOREIGN PATENT DOCUMENTS

| CN | 101544453 A | 9/2009 |
| CN | 101786779 A | 7/2010 |

OTHER PUBLICATIONS

Li, Lipin, "A2O Enhanced Nitrogen and Phosphorus Removal and Sludge Reduction Combination Process Efficiency and Mechanism", B027-292, China Ph.D. Dissertation Full-text Database, Engineering Science and Technology Series I.

* cited by examiner

*Primary Examiner* — Chester T Barry
(74) *Attorney, Agent, or Firm* — Novoclaims Patent Services LLC; Mei Lin Wong

(57) ABSTRACT

An integrated equipment and treatment method for synchronous ecological treatment of domestic sewage and sludge, the equipment includes a one-piece box-shaped main body divided into several tank compartments which includes an anaerobic tank, a sludge reduction and denitrification tank, an aerobic tank, a sedimentation tank, and a disinfection tank, an inlet pipe for sewage and sludge entrance and an outlet pipe for exit of effluent after treatment. The sludge reduction and denitrification tank is equipped with variable microporous aeration pipes, worm fillers and multi-functional water quality online detectors. The aerobic tank is equipped with aeration pipeline components and DO online detectors. The sewage and sludge are guided to passing through the different tank compartments in order for simultaneous sewage treatment and sludge reduction. The removal rate of total nitrogen is as high as 85%, and the (Continued)

simultaneous reduction effect of sludge can reach more than 60%.

11 Claims, 1 Drawing Sheet

(51) Int. Cl.
*C02F 1/32* (2023.01)
*C02F 3/20* (2023.01)
*C02F 3/30* (2023.01)
*C02F 3/32* (2023.01)

(52) U.S. Cl.
CPC .............. *C02F 3/201* (2013.01); *C02F 3/302* (2013.01); *C02F 3/327* (2013.01); *C02F 2203/006* (2013.01); *C02F 2209/22* (2013.01); *C02F 2209/38* (2013.01); *C02F 2301/08* (2013.01); *C02F 2303/04* (2013.01); *C02F 2303/06* (2013.01)

INTEGRATED DEVICE AND TREATMENT METHOD FOR SYNCHRONOUS ECOLOGICAL TREATMENT OF DOMESTIC SEWAGE AND SLUDGE

CROSS REFERENCE OF RELATED APPLICATION

This is a non-provisional application which claimed priority of Chinese application number 202210380178.8, filing date 04/12/2022. The contents of these specifications, including any intervening amendments thereto, are incorporated herein by reference.

BACKGROUND OF THE PRESENT INVENTION

Field of Invention

The present invention relates to a sewage treatment equipment, and more particularly to an integrated device and treatment method for synchronous ecological treatment of domestic sewage and sludge.

Description of Related Arts

Aiming at the difficult problem of collection and treatment of decentralized domestic sewage, integrated sewage treatment equipment has attracted widespread attention due to its advantages such as small footprint, small construction engineering volume, and short construction period, and has become the most important technical method for treatment of decentralized domestic sewage. However, in the application of existing integrated sewage treatment equipment, there are many problems such as the use of numerous processes and equipment, high energy consumption, high operation and maintenance costs, and difficult operation, and a large amount of sludge by-products will be generated during the sewage treatment process. Thus, this seriously hinders the promotion and application of integrated sewage treatment equipment. Therefore, it is necessary to design an integrated equipment with compact structure, simple operation and maintenance, high efficiency and low consumption, and synchronous ecological treatment of sewage and sludge.

SUMMARY OF THE PRESENT INVENTION

An object of the present invention is to solve the problems of many functional parts, high energy consumption, high operation and maintenance cost and difficult operation in the application of the existing integrated sewage treatment equipment, and to provide an integrated equipment and treatment method for synchronous ecological treatment of domestic sewage and sludge.

In order to achieve the above object, the present invention provides an integrated equipment for synchronous ecological treatment of domestic sewage and sludge, which comprises a one-piece box-shaped main body, a plurality of partition members which divide the one-piece box-shaped main body into an anaerobic tank, a sludge reduction and denitrification tank, an aerobic tank, a sedimentation tank and a disinfection tank along a flow direction, a water inlet pipe installed at a bottom of an outer wall of the one-piece box-shaped main body and connected to the anaerobic tank; a first diversion pipe on an upper part of a side wall of the anaerobic tank connecting the anaerobic tank and the sludge reduction and denitrification tank; a second diversion pipe on a lower part of a side wall of the sludge reduction and denitrification tank connecting the sludge reduction and denitrification tank and the aerobic tank; a third diversion pipe on an upper part of a side wall of the aerobic tank connecting the aerobic tank and the sedimentation tank; and an outlet weir on an upper part of a side wall of the sedimentation tank connecting the sedimentation tank and the disinfection tank; and an outlet pipe is installed on an upper part of an outer wall of the disinfection tank.

The top of the one-piece box-shaped main body is provided with a first inspection hole, a second inspection hole and a third inspection hole respectively in sequence.

The sludge reduction and denitrification tank comprises a worm filler inside its tank cavity, a multifunctional water quality online detector installed inside the tank cavity, and a variable microporous aeration pipe installed at a bottom side of the sludge reduction and denitrification tank inside the tank cavity.

The aerobic tank comprises an aeration pipeline assembly at a bottom side inside its tank cavity, a DO online detector installed inside the aerobic tank, and a nitrification solution return pipe extended between a bottom part of the tank cavity of the aerobic tank and an upper part of the tank cavity of the sludge reduction and denitrification tank.

The sedimentation tank comprises a central guide pipe having an inlet connected to an outlet of the third diversion pipe; a reflection plate located immediately below an outlet of the central guide pipe, and a sludge return pipe extended between a bottom part of the sedimentation tank and an upper part of the anaerobic tank.

The disinfection tank comprises an ultraviolet disinfection device vertically extended on one side of the disinfection tank.

The worm filler is selected from one or more of: a fixed bed flat filler, an inclined plate filler and a suspension filler.

The variable microporous aeration pipe 8 is equipped with an automatic gas flow regulator.

The variable microporous aeration pipe automatically adjusts the aeration rate according to the detection data of the multifunctional water quality online detector so that the DO in the sludge reduction and denitrification tank is maintained at 0.2~1.0 mg/L.

The aeration pipeline assembly automatically adjusts the gas flow according to the detection data of the DO online detector so that the DO in the aerobic tank is maintained at 3~4 mg/L.

The nitrification liquid in the aerobic tank is returned to the sludge reduction and denitrification tank through the nitrification liquid return pipe, and the return ratio is controlled at 200%~300%.

The sludge in the sedimentation tank is returned to the anaerobic tank through the sludge return pipe, and the return ratio is controlled at 70%-100%.

The integrated equipment for synchronous ecological treatment of domestic sewage and sludge is made of acid-resistant, alkali-resistant and anti-corrosion materials.

The sludge return pipe has one end positioned between the reflection plate and an inner bottom wall of the anaerobic tank.

The outlet of the central guide pipe is close to the bottom of the sedimentation tank.

According to another aspect of the present invention, a treatment process of domestic sewage and sludge by an integrated equipment for synchronous ecological treatment of domestic sewage and sludge, which comprises an anaerobic tank, a sludge reduction and denitrification tank, an aerobic tank, a sedimentation tank and a disinfection tank, comprises the steps of:

(a) introducing integrated domestic sewage and sludge into the anaerobic tank through a water inlet pipe for treatment to obtain a sludge-water mixture;

(b) introducing the sludge-water mixture from the anaerobic tank into the sludge reduction and denitrification tank through a first diversion pipe, opening a variable microporous aeration pipe for sludge reduction and denitrification treatment;

(c) introducing the sludge-water mixture after treatment from the sludge reduction and denitrification tank into the aerobic tank through a second diversion pipe, opening an aeration pipe assembly and automatically adjusting a gas flow in response to detection data from a DO online detector being installed;

(d) introducing the sludge-water mixture into the sedimentation tank through a third diversion pipe and a central diversion pipe, and returning sediment to the anaerobic tank through a sludge return pipe;

(e) diverting a flow of a supernatant after sedimentation in the sedimentation tank into the disinfection tank through an outlet weir, turning on an ultraviolet disinfection device for disinfection process; and (f) diverting a flow of liquid part out of the disinfection tank through an outlet pipe to complete the treatment process in the integrated equipment for synchronous ecological treatment of domestic sewage and sludge.

The sewage residence time in the integrated equipment for synchronous ecological treatment of domestic sewage and sludge is 8~10 hours. The reflux ratio of nitrification solution is controlled at 200%~300%. The sludge return ratio is controlled at 70%~100%.

According to another aspect of the present invention, the present invention provides an integrated equipment for synchronous ecological treatment of domestic sewage and sludge, which comprises a one-piece box-shaped main body, a plurality of partition members which divide the one-piece box-shaped main body into an anaerobic tank, a sludge reduction and denitrification tank, an aerobic tank, and a disinfection tank along a flow direction, a water inlet pipe installed at a bottom of an outer wall of the one-piece box-shaped main body and connected to the anaerobic tank; a first diversion pipe on an upper part of a side wall of the anaerobic tank connecting the anaerobic tank and the sludge reduction and denitrification tank; a second diversion pipe on a lower part of a side wall of the sludge reduction and denitrification tank connecting the sludge reduction and denitrification tank and the aerobic tank; a third diversion pipe on an upper part of a side wall of the aerobic tank connecting the aerobic tank and the disinfection tank; and an outlet pipe is installed on an upper part of an outer wall of the disinfection tank.

The top of the one-piece box-shaped main body is provided with a first inspection hole, a second inspection hole and a third inspection hole respectively in sequence.

The sludge reduction and denitrification tank comprises a worm filler inside its tank cavity, a multifunctional water quality online detector installed inside the tank cavity, and a variable microporous aeration pipe installed at a bottom side of the sludge reduction and denitrification tank inside the tank cavity.

The aerobic tank comprises an aeration pipeline assembly at a bottom side inside its tank cavity, a DO online detector installed inside the aerobic tank, and a nitrification solution return pipe extended between a bottom part of the tank cavity of the aerobic tank and an upper part of the tank cavity of the sludge reduction and denitrification tank.

The aerobic tank comprises a sludge return pipe extended between a bottom part of the aerobic tank and an upper part of the anaerobic tank; and a membrane assembly inside the aerobic tank.

The disinfection tank comprises an ultraviolet disinfection device vertically extended on one side of the disinfection tank.

The advantages of the present invention are as follows:

(1) The integrated equipment of the present invention is compact in structure, simple in operation and maintenance, occupies a small area, and is buried and installed underground without occupying space above the ground.

(2) The integrated equipment of the present invention can simultaneously realize sewage denitrification and efficient sludge reduction. The hydrophilic porous filler in the sludge reduction and denitrification tank and the automatic adjustment of the variable aeration device are conducive to the rapid film formation of denitrification bacteria and the efficient attachment of worms (It takes only 10 days to complete the start-up film-hanging process, which is about 10 days shorter than the general bio-film-hanging method; the worms can attach to the filler stably for a long time, the density of worms on the filler can reach 2~2.5 kg/m$^2$, calculated by wet weight.). At the same time, it has technical advantages of both activated sludge method and biofilm method so that the denitrification efficiency is increased dramatically. (The removal rate of ammonia nitrogen can reach above 95%, and the removal rate of total nitrogen can reach above 85%). In addition, by extending the food chain method with the use of worms to reduce the sludge quantity, the advantages of high efficiency low consumption, and no secondary pollution are achieved.

(3) The integrated equipment of the present invention constructs the synergistic effect of worm predation and microbial metabolism. Worm predation destroys the sludge structure, promotes the release of carbon sources, saves the cost of additional carbon sources in the denitrification process, and improves the denitrification efficiency. The denitrification process refers to biological denitrification in which organic nitrogen (such as protein and ammonia nitrogen) in sewage undergo ammonification, nitrification, and denitrification reactions under the combined action of microorganisms, and finally transform into nitrogen.

(4) The integrated equipment of the present invention has a high degree of intelligence, and the integrated equipment adopts a PLC automatic control program, and the operation control parameters can be adjusted at any time according to the operating conditions, and the operation is convenient and fast. Moreover, the aeration system, nitrification liquid return system, and sludge return system all adopt automatic control systems, which save energy and reduce consumption while improving the efficiency of sewage sludge treatment.

(5) The water treatment process of the integrated equipment of the present invention has the advantages of strong impact load resistance, stable and reliable operation, achieving stable sewage standard, efficient sludge reduction and remarkable ecological benefits, etc. All indicators of the effluent have reached the first-level A standard of the "Pollutant Discharge Standards for Urban Sewage Treatment Plants" (GB 18918-2002), and the sludge reduction effect can reach more than 60%.

(6) All parts in the integrated equipment of the present invention are made of acid-resistant, alkali-resistant and anti-corrosion materials, which prolongs the service life of the equipment and improves the service life of the equipment.

DETAILED DESCRIPTION OF THE PREFERRED EMBODIMENT

Figure 1:
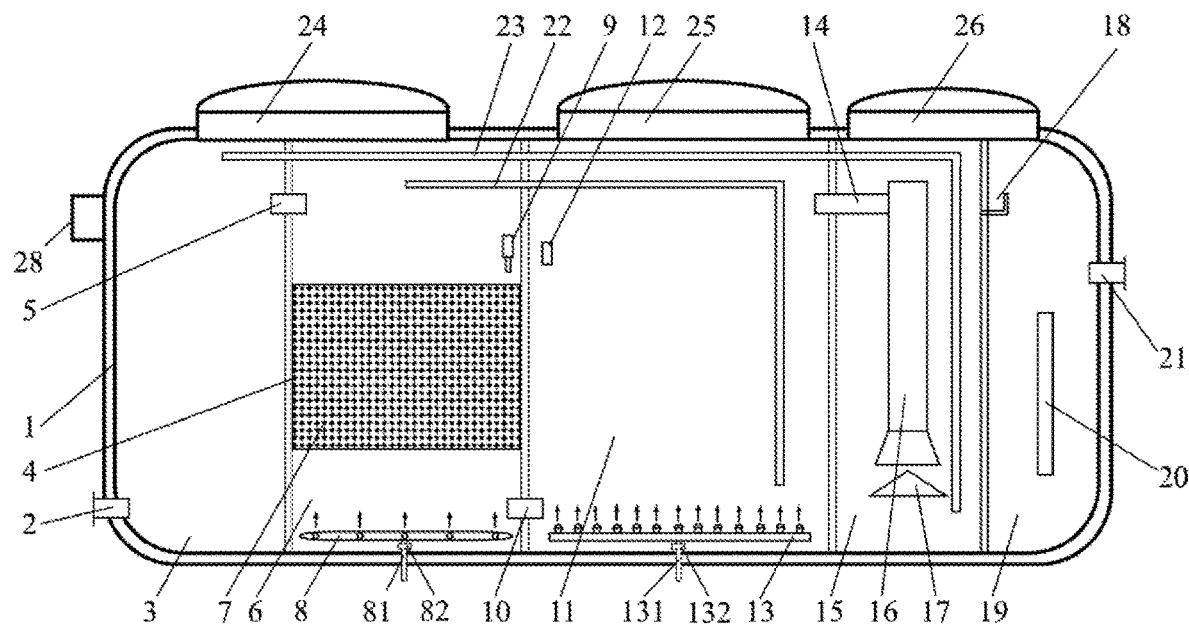
FIG. 1 is a schematic diagram of an integrated equipment for synchronous ecological treatment of domestic sewage and sludge according to a preferred embodiment of the present invention.

The present invention is further described in details below with the accompanying drawings.

Embodiment 1

According to this embodiment of the present invention, an integrated equipment for synchronous ecological treatment of domestic sewage and sludge comprises: a one-piece box-shaped main body 1, a plurality of partition members 4 which sequentially divide the one-piece box-shaped main body 1 into an anaerobic tank 3, a sludge reduction and denitrification tank 6, an aerobic tank 11, a sedimentation tank 15 and a disinfection tank 19 along a water flow direction, an inlet pipe 2 installed at a bottom of an outer wall of the one-piece box-shaped main body 1 and connected to the anaerobic tank 3; a first diversion pipe 5 on an upper part of a side wall of the anaerobic tank 3 connecting the anaerobic tank 3 and the sludge reduction and denitrification tank 6; a second diversion pipe 10 on a lower part of a side wall of the sludge reduction and denitrification tank 6 connecting the sludge reduction and denitrification tank 6 and the aerobic tank 11; a third diversion pipe 14 on an upper part of a side wall of the aerobic tank 11 connecting the aerobic tank 11 and the sedimentation tank 15; and an outlet weir 18 on an upper part of a side wall of the sedimentation tank 15 connecting the sedimentation tank 15 and the disinfection tank 19; and an outlet pipe 21 is installed on an upper part of an outer wall of the disinfection tank 19.

The top of the one-piece box-shaped main body 1 is provided with a first inspection hole 24, a second inspection hole 25 and a third inspection hole 26 respectively in sequence. Preferably, as shown in FIG. 1 of the drawings, the first inspection hole 24 is provided on a top side of the anaerobic tank 3 and the sludge reduction and denitrification tank 6; the second inspection hole 25 is provided on a top side of the aerobic tank 11; the third inspection hole 26 is provided on a top side of the sedimentation tank 15 and the disinfection tank 19.

The sludge reduction and denitrification tank 6 comprises a worm filler 7 in the middle part inside its tank cavity, a multifunctional water quality online detector 9 installed inside the tank cavity and arranged to communicate with a processor 28 through an electrical wire, and a variable microporous aeration pipe 8 installed at a bottom side of the sludge reduction and denitrification tank inside the tank cavity and communicating to gas supply from outside through a connecting pipe 81. The worm filler 7 includes porous bio-affinity and hydrophilic materials arranged for facilitating worm attachment. The variable microporous aeration pipe 8 has a plurality of pores which can be expand by themselves when the variable microporous aeration pipe 8 is aerated with oxygen and comprises air valve to prevent any liquid from entering inside the variable microporous aeration pipe 8 such that air entering inside the variable microporous aeration pipe 8 does not need to be filtered and intermittent aeration will not cause blockage.

The aerobic tank 11 comprises an aeration pipeline assembly 13, a DO (Dissolved Oxygen) online detector 12 installed inside the aerobic tank 11, and a nitrification solution return pipe 22 extended between a bottom part of the tank cavity of the aerobic tank 11 and an upper part of the tank cavity of the sludge reduction and denitrification tank 6. Preferably, the aeration pipeline assembly 13 mainly comprises a pipeline, an air valve, a plurality of aerators and is communicating to gas supply from outside through a connecting pipe 131; and the nitrification solution return pipe 22 is equipped with a return pump for returning the liquid from the aerobic tank 11 to the sludge reduction and denitrification tank 6. The aeration pipeline assembly 13 and the DO online detector 12 communicate with the processor 28 through electrical wires so that the aeration rate of the aeration pipeline assembly 13 can be adjusted according to the data from the DO online detector 12 through a flow control valve 132 of the aeration pipeline assembly 13.

The sedimentation tank 15 comprises a central guide pipe 16 having an inlet connected to an outlet of the third diversion pipe 14; a reflection plate 17 located immediately below an outlet of the central guide pipe 16 in the bottom end of the sedimentation tank 15, and a sludge return pipe 23 extended between a bottom part of the sedimentation tank 15 and an upper part of the anaerobic tank 3. Preferably, the sludge return pipe 23 is equipped with a return pump for returning the sludge from the sedimentation tank 15 to the anaerobic tank 3.

The disinfection tank 19 comprises an ultraviolet disinfection device 20 vertically extended on one side of the disinfection tank 19. Preferably, the ultraviolet disinfection device 20 is an ultraviolet lamp.

The worm filler 7 is one or a combination of the followings: a fixed bed flat filler, an inclined plate filler and a suspension filler.

The variable microporous aeration pipe 8 is equipped with an automatic gas flow regulator 82, and the automatic gas flow regulator 82 is arranged to connect to the processor 28 through an electrical wire for receiving the data from the multifunctional water quality online detector 9.

The variable microporous aeration pipe 8 automatically adjusts the aeration rate according to the detection data of the multifunctional water quality online detector 9 so that the DO in the sludge reduction and denitrification tank 6 is maintained at 0.2~1.0 mg/L.

The aeration pipeline assembly 13 automatically adjusts the gas flow according to the detection data of the DO online detector 12 so that the DO in the aerobic tank 11 is maintained at 3~4 mg/L.

The nitrification liquid in the aerobic tank 11 is returned to the sludge reduction and denitrification tank 6 through the nitrification liquid return pipe 22, and the return ratio is controlled at 200%~300%.

The sludge in the sedimentation tank 15 is returned to the anaerobic tank 3 through the sludge return pipe 23, and the return ratio is controlled at 70%-100%.

The working principle of the integrated equipment in this embodiment for small-scale domestic sewage treatment is as follows:

The domestic sewage enters the bottom part of the anaerobic tank 3 through the inlet pipe 2, and the water flow rises slowly from the bottom to the top. The organic matters in the sewage is hydrolyzed, acidified and methanated by anaerobic bacteria, and some parts of the COD in the sewage is removed. At the same time, the high-molecular refractory organic matter in the sewage is decomposed into small molecular easy-degradable organic matter, which improves the biodegradability of the sewage, while the phosphorus-accumulating bacteria in the sludge release phosphorus in the anaerobic tank 3. When a certain water level is reached, the sewage enters the sludge reduction and denitrification tank 6 through the first diversion pipe 5. The sludge reduction and denitrification tank 6 is provided with a worm attachment plate 7 in the middle part and a variable microporous aeration pipe 8 laid on the bottom. The micro-oxic-anoxic alternate aeration mode of the hydrophilic porous filler in the worm attachment plate 7 and the variable microporous aeration tube 8 is conducive to the rapid film formation of denitrifying bacteria and the efficient attachment of worms, thus the synergy between worm predation and microbial metabolism is constructed. It not only gives full play to the technical advantages of activated sludge method and biofilm method, which improves the nitrogen removal efficiency, but also uses the principle of gradual decline of energy in the process of food chain transfer in ecology to achieve efficient sludge reduction. Also, through the selection of worm predation and the domestication of micro-oxic-anoxic alternate environment, the functional flora is strengthened and the sludge properties are modified. After denitrification and worm predation in the sludge reduction and denitrification tank 6, there is still a certain amount of organic matters and a relatively high level of ammonia nitrogen and phosphate in the sewage. In order to further degrade the organic matters, carry out normal nitrification, and efficiently remove phosphorus in the sewage, the aerobic tank 11 is arranged. The nitrification in the aerobic tank 11 is to convert the ammonia nitrogen in the sewage into nitrite and nitrate by nitrifying bacteria (autotrophic bacteria) using the inorganic carbon source produced from decomposition of organic matters by other aerobic microorganisms or the carbon dioxide in the air as a nutrient source. The further degradation of organic matter is achieved by the catabolism of aerobic microorganisms. The removal of phosphorus in the sewage is achieved through the aerobic phosphorus uptake by phosphorus accumulating bacteria. One part of the sewage in the aerobic tank 11 is returned to the sludge reduction and denitrification tank 6 through the nitrifying liquid return pipe 22 for internal circulation, so as to achieve the denitrification. The other part of the sewage enters the sedimentation tank 15 through the third diversion pipe 14 for sedimentation to complete the separation of sludge and water. The sludge settled in the sedimentation tank 15 is returned to the anaerobic tank 3 through the sludge return pipe 23 for further sewage treatment and sludge reduction so as to ensure the quality of effluent water and the efficient reduction of sludge. The sewage treated by the sedimentation tank 15 enters the disinfection tank 19 from the outlet weir 18, and the bacteria and suspended solids in the sewage are effectively purified by ultraviolet disinfection and sterilization. After treatment, the sewage meets the Class A standard of the Discharge Standard of Pollutants for Urban Sewage Treatment Plants (GB 18918-2002), and is finally discharged through the outlet pipe 21.

Embodiment 2

The above-mentioned equipment is used for the treatment of domestic sewage in rural area. Three sets of equipment are used for comparison experiments, which are: the equipment in Embodiment 1 with no filler and no worms being placed in the sludge reduction and denitrification tank 6 (denoted as AAO equipment), the equipment in Embodiment 1 with filler but no worms added in the filler being placed in the sludge reduction and denitrification tank 6 (denoted as AFO equipment), the equipment in Embodiment 1 with both filler and worms being placed in the sludge reduction and denitrification tank 6 (referred to as AWO equipment). Except for the above differences in settings, the three sets of equipment have the same control parameters in operation.

In the system, influent COD concentration is 180~220 mg/L, ammonia nitrogen concentration is 23~28 mg/L, total nitrogen concentration is 24~35 mg/L, and total phosphorus concentration is 3~4 mg/L. The sewage residence time in the system is 8 hours, the sludge residence time is 15 days, the DO in the sludge reduction and denitrification tank 6 is maintained at 0.2-1.0 mg/L, and the DO in the aerobic tank 11 is maintained at 3-4 mg/L, the reflux ratio of the nitrifying liquid is controlled at 250%, the sludge reflux ratio is controlled at 80%, and the system is operated for 30 days in total. The first 10 days is the system start-up period, which is the period of rapid biofilm formation and stable growth of worms. The last 20 days is the stable operation period of the system. After being treated by the above three sets of equipment, AAO, AFO and AWO, the sewage sludge treatment effect are shown in Table 1.

TABLE 1

The Sewage Sludge Treatment Effect of Three Sets of Equipment

| Equipment | COD removal rate | NH4+-N removal rate (%) | TN removal rate (%) | TP removal rate (%) | Sludge reduction (%) |
|---|---|---|---|---|---|
| AAO | 90.8% | 85.7% | 74.3% | 65.5% | / |
| AFO | 91.3% | 87.4% | 78.1% | 67.7% | 38% |
| AWO | 94.6% | 96.8% | 87.3% | 86.8% | 65% |

Comparing the sewage sludge treatment effects of the above three sets of equipment, it can be seen that the AWO integrated equipment has constructed a synergistic effect between worm predation and microbial metabolism, which has significantly improved the denitrification efficiency of denitrification, and the removal rate of ammonia nitrogen is increased by 11.1% and 9.4% compared with AAO and AFO, respectively. Compared with AAO and AFO, the total nitrogen removal rate has increased by 13.0% and 9.2% respectively, and all the indicators of the effluent have reached the first-level A standard of the "Pollutant Discharge Standards for Urban Sewage Treatment Plants" (GB 18918-2002), and the amount of sludge has been reduced up to 65%. The integrated equipment operates stably and reliably, the sewage reaches the standard stably, the sludge is efficiently reduced and the ecological benefits are remarkable, and the synchronous ecological treatment of sewage denitrification and efficient sludge reduction has been successfully realized.

Embodiment 3

According to this embodiment of the present invention, an integrated equipment for synchronous ecological treatment of domestic sewage and sludge comprises: a one-piece box-shaped main body 1, a plurality of partition members 4 which sequentially divide the one-piece box-shaped main body 1 into an anaerobic tank 3, a sludge reduction and denitrification tank 6, an aerobic tank 11 and a disinfection tank 19 along a water flow direction, an inlet pipe 2 installed at a bottom of an outer wall of the one-piece box-shaped main body 1 and connected to the anaerobic tank 3; a first diversion pipe 5 on an upper part of a side wall of the anaerobic tank 3 connecting the anaerobic tank 3 and the sludge reduction and denitrification tank 6; a second diversion pipe 10 on a lower part of a side wall of the sludge reduction and denitrification tank 6 connecting the sludge reduction and denitrification tank 6 and the aerobic tank 11; a third diversion pipe 14 on an upper part of a side wall of the aerobic tank 11 connecting the aerobic tank 11 and the disinfection tank 19; and an outlet pipe 21 is installed on an upper part of an outer wall of the disinfection tank 19.

Figure 2:
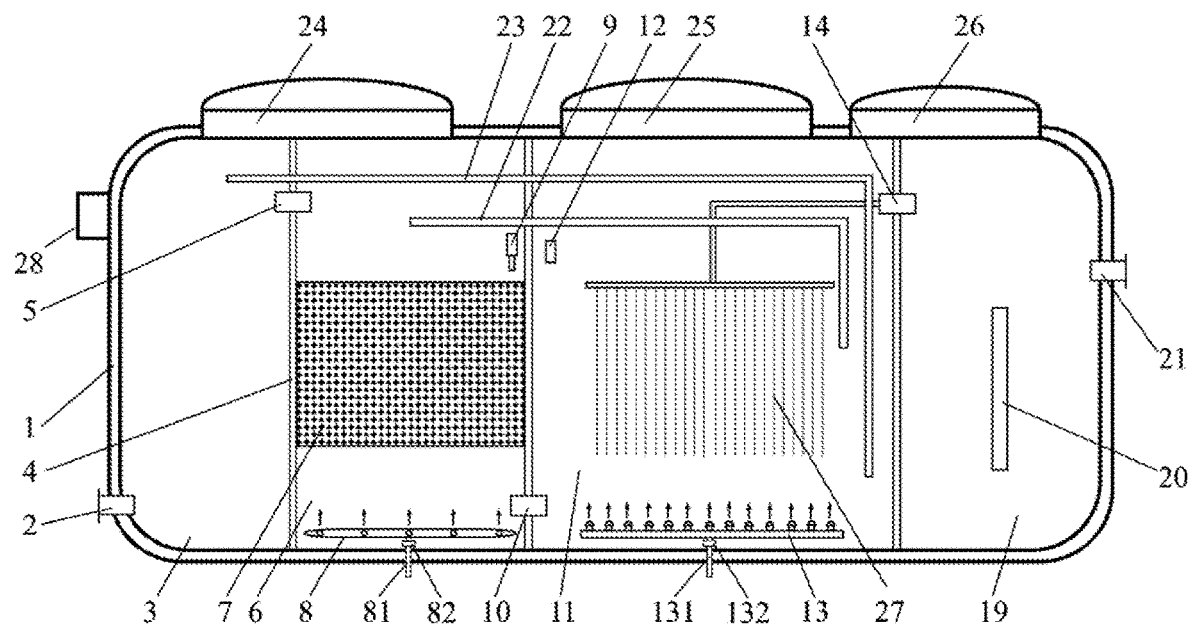
FIG. 2 is a schematic diagram of an integrated equipment for synchronous ecological treatment of domestic sewage and sludge without the use of a sedimentation tank according to a preferred embodiment of the present invention.

The top of the one-piece box-shaped main body 1 is provided with a first inspection hole 24, a second inspection hole 25 and a third inspection hole 26 respectively in sequence. Preferably, as shown in FIG. 2 of the drawings, the first inspection hole 24 is provided on a top side of the anaerobic tank 3 and the sludge reduction and denitrification tank 6; the second inspection hole 25 is provided on a top side of the aerobic tank 11; the third inspection hole 26 is provided on a top side of the aerobic tank 11 and the disinfection tank 19.

The sludge reduction and denitrification tank 6 comprises a worm filler 7 in the middle part inside its tank cavity, a multifunctional water quality online detector 9 installed inside the tank cavity and arranged to communicate with a processor 28 through an electrical wire, and a variable microporous aeration pipe 8 installed at a bottom side of the sludge reduction and denitrification tank inside the tank cavity and communicating to gas supply from outside through a connecting pipe 81. The worm filler 7 includes porous bio-affinity and hydrophilic materials arranged for facilitating worm attachment. The variable microporous aeration pipe 8 has a plurality of pores which can be expand by themselves when the variable microporous aeration pipe 8 is aerated with oxygen and comprises an air valve to prevent any liquid from entering inside the variable microporous aeration pipe 8 such that air entering inside the variable microporous aeration pipe 8 does not need to be filtered and intermittent aeration will not cause blockage.

The aerobic tank 11 comprises an aeration pipeline assembly 13, a DO (Dissolved Oxygen) online detector 12 installed inside the aerobic tank 11, and a nitrification solution return pipe 22 extended between a bottom part of the tank cavity of the aerobic tank 11 and an upper part of the tank cavity of the sludge reduction and denitrification tank 6. Preferably, the aeration pipeline assembly 13 mainly comprises a pipeline, an air valve and a plurality of aerators and is communicating to gas supply from outside through a connecting pipe 131; and the nitrification solution return pipe 22 is equipped with a return pump for returning the liquid from the aerobic tank 11 to the sludge reduction and denitrification tank 6. Preferably, the aeration pipeline assembly 13 and the DO online detector 12 communicate with the processor 28 through electrical wires so that the aeration rate of the aeration pipeline assembly 13 can be adjusted according to the data from the DO online detector 12 through a flow control valve 132 of the aeration pipeline assembly 13.

The aerobic tank 11 further includes a sludge return pipe 23 extended between a bottom part of the aerobic tank 11 and an upper part of the anaerobic tank 3.

The disinfection tank 19 comprises an ultraviolet disinfection device 20 vertically extended on one side of the disinfection tank 19. Preferably, the ultraviolet disinfection device 20 is an ultraviolet lamp. The aerobic tank 11 comprises a membrane assembly 27 such as RGE membrane assembly, hollow fiber membrane, flat sheet membrane, tubular membrane and roll membrane installed inside its cavity. For example, a typical RGE membrane assembly includes a RGE membrane, an aeration pipe, a casing, and two types of water pipes.

The worm filler 7 is one or a combination of the followings: a fixed bed flat filler, an inclined plate filler and a suspension filler.

The variable microporous aeration pipe 8 is equipped with an automatic gas flow regulator 82, and the automatic gas flow regulator 82 is arranged to connect to the processor 28 through an electrical wire for receiving the data from the multifunctional water quality online detector 9.

The variable microporous aeration pipe 8 automatically adjusts the aeration rate according to the detection data of the multifunctional water quality online detector 9 so that the DO in the sludge reduction and denitrification tank 6 is maintained at 0.2~1.0 mg/L.

The aeration pipeline assembly 13 automatically adjusts the gas flow according to the detection data of the DO online detector 12 so that the DO in the aerobic tank 11 is maintained at 3~4 mg/L.

The nitrification liquid in the aerobic tank 11 is returned to the sludge reduction and denitrification tank 6 through the nitrification liquid return pipe 23, and the reflux ratio is controlled at 200%~300%.

Embodiment 4

The above-mentioned equipment in Embodiment 3 is used for the treatment of domestic sewage in rural area. Three sets of equipment are used for comparison experiments, which are: the equipment in Embodiment 3 with no filler and no worms being placed in the sludge reduction and denitrification tank 6 (denoted as AAO-M equipment), the equipment in Embodiment 3 with filler but no worms added in the filler being placed in the sludge reduction and denitrification tank 6 (denoted as AFO-M equipment), the equipment in Embodiment 3 with both filler and worms being placed in the sludge reduction and denitrification tank 6 (referred to as AWO-M equipment). Except for the above differences in settings, the three sets of equipment have the same control parameters in operation.

In the system, influent COD concentration is 180~220 mg/L, ammonia nitrogen concentration is 23~28 mg/L, total nitrogen concentration is 24~35 mg/L, and total phosphorus concentration is 3~4 mg/L. The sewage residence time in the system is 8 hours, the sludge residence time is 30 days, the DO in the sludge reduction and denitrification tank 6 is maintained at 0.2-1.0 mg/L, and the DO in the aerobic tank 11 is maintained at 3-4 mg/L, the reflux ratio of the nitrifying liquid is controlled at 250%, the sludge reflux ratio is controlled at 80%, and the system is operated for 30 days in total. The first 10 days is the system start-up period, which is the period of rapid biofilm formation and stable growth of worms. The last 20 days is the stable operation period of the system. After being treated by the above three sets of equipment, AAO-M, AFO-M and AWO-M, the sewage sludge treatment effect are shown in Table 2.

TABLE 2

The Sewage Sludge Treatment Effect of Three Sets of Equipment

| Equipment | COD removal rate | NH4+-N removal rate (%) | TN removal rate (%) | TP removal rate (%) | Sludge reduction (%) |
|---|---|---|---|---|---|
| AAO-M | 91.9% | 86.7% | 75.5% | 67.4% | / |
| AFO-M | 93.4% | 89.1% | 79.7% | 68.1% | 42% |
| AWO-M | 96.7% | 97.3% | 89.6% | 87.6% | 76% |

Comparing the sewage sludge treatment effects of the above three sets of equipment, it can be seen that the AWO-M integrated equipment has constructed a synergistic effect between worm predation and microbial metabolism, which has significantly improved the denitrification efficiency of denitrification, and the removal rate of ammonia nitrogen is increased by 10.6% and 8.2% compared with AAO-M and AFO-M, respectively. Compared with AAO-M and AFO-M, the total nitrogen removal rate has increased by 14.1% and 9.9% respectively, and all the indicators of the effluent have reached the first-level A standard of the "Pollutant Discharge Standards for Urban Sewage Treatment Plants" (GB 18918-2002), and the amount of sludge has been reduced up to 76%. The integrated equipment operates stably and reliably, the sewage reaches the standard stably, the sludge is efficiently reduced and the ecological benefits are remarkable, and the synchronous ecological treatment of sewage denitrification and efficient sludge reduction has been successfully realized.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An integrated equipment for synchronous ecological treatment of domestic sewage and sludge, comprising:
   a one-piece main body (1);
   a plurality of partition members (4) which sequentially divide the one-piece main body (1) into an anaerobic tank (3), a sludge reduction and denitrification tank (6), an aerobic tank (11), a sedimentation tank (15) and a disinfection tank (19) along a water flow direction from a front end to a rear end;
   an inlet pipe (2) installed at a bottom part of an outer side wall of the one-piece main body (1) and connected to the anaerobic tank (3);
   a first diversion pipe (5) on an upper part of a side wall of the anaerobic tank (3) connecting the anaerobic tank (3) and the sludge reduction and denitrification tank (6);
   a second diversion pipe (10) on a bottom part of a side wall of the sludge reduction and denitrification tank (6) connecting the sludge reduction and denitrification tank (6) and the aerobic tank (11);
   a third diversion pipe (14) on an upper part of a side wall of the aerobic tank (11) connecting the aerobic tank (11) and the sedimentation tank (15);
   an outlet weir (18) on an upper part of a side wall of the sedimentation tank (15) connecting the sedimentation tank (15) and the disinfection tank (19); and
   an outlet pipe (21) installed on an upper part of an outer wall of the disinfection tank (19);
   wherein a top side of the one-piece main body (1) further comprises a first inspection hole (24), a second inspection hole (25) and a third inspection hole (26) respectively in sequence,
   wherein the sludge reduction and denitrification tank (6) comprises a worm filler (7) in a middle part inside the sludge reduction and denitrification tank (6), a multifunctional water quality online detector (9) installed inside the sludge reduction and denitrification tank (6), and a variable microporous aeration pipe (8) installed at a bottom side inside the sludge reduction and denitrification tank (6),
   wherein the aerobic tank (11) comprises an aeration pipeline assembly (13), a DO online detector (12) installed inside the aerobic tank (11), and a nitrification solution return pipe (22) extended between a bottom part of the tank cavity of the aerobic tank (11) and an upper part of the tank cavity of the sludge reduction and denitrification tank (6),
   wherein the sedimentation tank (15) comprises a central guide pipe (16) having an inlet connected to an outlet of the third diversion pipe (14); a reflection plate (17) located immediately below an outlet of the central guide pipe (16), and a sludge return pipe (23) extended between a bottom part of the sedimentation tank (15) and an upper part of the anaerobic tank (3),
   wherein the disinfection tank (19) comprises an ultraviolet disinfection device (20) vertically extended on one side of the disinfection tank (19).

2. The integrated equipment for synchronous ecological treatment of domestic sewage and sludge according to claim 1, wherein the worm filler (7) is one or a combination of: a fixed bed flat filler, an inclined plate filler and a suspension filler.

3. The integrated equipment for synchronous ecological treatment of domestic sewage and sludge according to claim 1, wherein the variable microporous aeration pipe (8) is equipped with an automatic gas flow regulator.

4. The integrated equipment for synchronous ecological treatment of domestic sewage and sludge according to claim 1, wherein the variable microporous aeration pipe (8) is configured to automatically adjust an aeration rate in response to data detected by the multifunctional water quality online detector (9) so that the DO in the sludge reduction and denitrification tank (6) is maintained at 0.2~1.0 mg/L.

5. The integrated equipment for synchronous ecological treatment of domestic sewage and sludge according to claim 1, wherein aeration pipeline assembly (13) is configured to automatically adjust a gas flow in response to data detected by the DO online detector (12) so that the DO in the aerobic tank (11) is maintained at 3-4 mg/L.

6. The integrated equipment for synchronous ecological treatment of domestic sewage and sludge according to claim 1, wherein the nitrification liquid in the aerobic tank (11) is returned to the sludge reduction and denitrification tank (6) through a nitrification liquid return pipe (23), and the reflux ratio is controlled at 200%-300%.

7. The integrated equipment for synchronous ecological treatment of domestic sewage and sludge according to claim 1, wherein sludge in the sedimentation tank (15) is returned to the anaerobic tank (3) through the sludge return pipe (23), and the reflux ratio is controlled at 70%-100%.

8. A treatment process using the integrated equipment according to claim 1, the process comprising the steps of:
  (a) introducing integrated domestic sewage and sludge into the anaerobic tank (3) through an inlet pipe (2) for treatment to obtain a sludge-water mixture;
  (b) introducing the sludge-water mixture from the anaerobic tank (3) into the sludge reduction and denitrification tank (6) through a first diversion pipe (5), opening a variable microporous aeration pipe (8) for sludge reduction and denitrification treatment;
  (c) introducing the sludge-water mixture after treatment from the sludge reduction and denitrification tank (6) into the aerobic tank (11) through a second diversion pipe (10), turning on an aeration pipe assembly (13) and automatically adjusting a gas flow in response to detection data from a DO online detector (12) being installed;
  (d) introducing the sludge-water mixture into the sedimentation tank (15) through a third diversion pipe (14) and a central diversion pipe (16), and returning sediment to the anaerobic tank (3) through a sludge return pipe (23);
  (e) diverting a flow of a supernatant after sedimentation in the sedimentation tank (15) into the disinfection tank (19) through an outlet weir (18), turning on an ultraviolet disinfection device (20) for disinfection process; and
  (f) diverting a flow of liquid part out of the disinfection tank (19) through an outlet pipe (21) to complete the treatment process in the integrated equipment for synchronous ecological treatment of domestic sewage and sludge.

9. The process according to claim 8, wherein a sewage residence time in the integrated equipment for synchronous ecological treatment of domestic sewage and sludge is 8~10 hours, a reflux ratio of nitrification solution is controlled at 200%-300%, and a sludge reflux ratio is controlled at 70%-100%.

10. An integrated equipment for synchronous ecological treatment of domestic sewage and sludge, comprising:
  a one-piece main body (1);
  a plurality of partition members (4) which sequentially divide the one-piece main body (1) into an anaerobic tank (3), a sludge reduction and denitrification tank (6), an aerobic tank (11) and a disinfection tank (19) along a water flow direction from a front end to a rear end;
  an inlet pipe (2) installed at a bottom part of an outer side wall of the one-piece main body (1) and connected to the anaerobic tank (3);
  a first diversion pipe (5) on an upper part of a side wall of the anaerobic tank (3) connecting the anaerobic tank (3) and the sludge reduction and denitrification tank (6);
  a second diversion pipe (10) on a bottom part of a side wall of the sludge reduction and denitrification tank (6) connecting the sludge reduction and denitrification tank (6) and the aerobic tank (11);
  a third diversion pipe (14) on an upper part of a side wall of the aerobic tank (11) connecting the aerobic tank (11) and the disinfection tank (19); and
  an outlet pipe (21) installed on an upper part of an outer wall of the disinfection tank (19);
  wherein a top side of the one-piece main body (1) further comprises a first inspection hole (24), a second inspection hole (25) and a third inspection hole (26) respectively in sequence,
  wherein the sludge reduction and denitrification tank (6) comprises a worm filler (7) in a middle part inside the sludge reduction and denitrification tank (6), a multifunctional water quality online detector (9) installed inside the sludge reduction and denitrification tank (6), and a variable microporous aeration pipe (8) installed at a bottom side inside the sludge reduction and denitrification tank (6),
  wherein the aerobic tank (11) comprises an aeration pipeline assembly (13), a DO online detector (12) installed inside the aerobic tank (11), and a nitrification solution return pipe (22) extended between a bottom part of the tank cavity of the aerobic tank (11) and an upper part of the tank cavity of the sludge reduction and denitrification tank (6),
  wherein the aerobic tank (11) comprises a sludge return pipe (23) extended between a bottom part of the aerobic tank (11) and an upper part of the anaerobic tank (3), and a membrane assembly (27) inside the aerobic tank (11),
  wherein the disinfection tank (19) comprises an ultraviolet disinfection device (20) vertically extended on one side of the disinfection tank (19).

11. The integrated equipment for synchronous ecological treatment of domestic sewage and sludge according to claim 3, wherein the variable microporous aeration pipe (8) is configured to automatically adjust an aeration rate in response to data detected by the multifunctional water quality online detector (9) so that the DO in the sludge reduction and denitrification tank (6) is maintained at 0.2~1.0 mg/L.

* * * * *